United States Patent
Yang

(10) Patent No.: US 9,535,449 B2
(45) Date of Patent: Jan. 3, 2017

(54) CIRCUIT FOR GENERATING USB PERIPHERAL CLOCK AND METHOD THEREFOR

(71) Applicant: IPGoal Microelectronics (Sichuan) Co., Ltd., Chengdu, Sichuan (CN)

(72) Inventor: Xiu Yang, Sichuan (CN)

(73) Assignee: IPGoal Microelectronics (Sichuan) Co., Ltd., Chengdu, Sichuan (CN)

( * ) Notice: Subject to any disclaimer, the term of this patent is extended or adjusted under 35 U.S.C. 154(b) by 367 days.

(21) Appl. No.: 14/084,467

(22) Filed: Nov. 19, 2013

(65) Prior Publication Data

US 2014/0143583 A1 May 22, 2014

(30) Foreign Application Priority Data

Nov. 19, 2012 (CN) .......................... 2012 1 0466086

(51) Int. Cl.
*G06F 1/00* (2006.01)
*G06F 1/04* (2006.01)

(52) U.S. Cl.
CPC ....................... *G06F 1/04* (2013.01)

(58) Field of Classification Search
CPC ....................................................... G06F 1/04
USPC ....................................................... 713/500
See application file for complete search history.

(56) References Cited

U.S. PATENT DOCUMENTS

| 8,656,203 B2* | 2/2014 | Burns | H03L 7/081 713/500 |
|---|---|---|---|
| 2005/0081076 A1* | 4/2005 | Okuda | G06F 1/08 713/600 |
| 2012/0056651 A1* | 3/2012 | Shen | H03L 7/08 327/156 |
| 2013/0103969 A1* | 4/2013 | Wang | G06F 1/12 713/502 |

* cited by examiner

*Primary Examiner* — Zahid Choudhury

(57) ABSTRACT

A circuit for generating USB peripheral clock comprises: an internal oscillator, a controllable frequency divider, a frequency multiplier, a receiving counter and a frequency division controller, wherein the internal oscillator generates a clock having a fixed frequency; the controllable frequency divider processes frequency division on the clock generated by the internal oscillator; the frequency multiplier processes frequency multiplication on the clock after frequency division and transmits the clock after frequency multiplication to the USB main structure; the receiving counter receives an SOF packet which is transmitted by a host according to the clock outputted by the frequency multiplier, and counts intervals of receiving the SOF packet; and the frequency division controller compares the difference between the counting result of the receiving counter and a standard interval, controls and regulates frequency division parameters of the controllable frequency divider according to a comparing result thereof.

4 Claims, 2 Drawing Sheets

CIRCUIT FOR GENERATING USB PERIPHERAL CLOCK AND METHOD THEREFOR

CROSS REFERENCE OF RELATED APPLICATION

The present application claims priority under 35 U.S.C. 119(a-d) to CN 201210466086.8, filed Nov. 19, 2012.

BACKGROUND OF THE PRESENT INVENTION

1. Field of Invention

The present invention relates to a field of USB communication, and more particularly to a circuit for generating a USB peripheral clock and a method therefor.

2. Description of Related Arts

USB is the abbreviation for Universal Serial BUS. Due to the advantages such as high communication speed, simple interface and convenient application thereof, recently the USB has become one of the standard interfaces essential to electronic equipments such as PC, MP4, mobile phone, PDA (Personal Digital Assistant), digital camera, printer and scanner. The USB is widely applied in fields of information communication, data transmission and etc.

The conventional communication systems all require a clock source with relative accuracy. The clock source is then processed with logics of frequency dividing, frequency doubling and etc. in the communication system, so as to generate a master clock required thereof for operating. The master clock collects and analyzes the data stream transmitted thereof, so as to accomplish the object of data communication. The USB communication system is no exception, and in a high-speed USB communication (with communication speed equal to or greater than 480 MHz), the system requires that the clock for data transmitting has a high accuracy (±0.5%). Therefore, technical solution adopted by the USB communication system is to connect a crystal oscillator on an external of the main body of the USB, i.e., the crystal oscillator generates an accurate clock on an external thereof, 12 MHz for instance, so as to be inputted to the internal of the chip in the main body of the USB, and is processed with frequency doubling in the internal of the chip by logic modules such as PLL (phase-locked loops), in such a manner that a high-speed clock of 480 MHz required by the system for operating is finally generated.

Due to the crystal oscillator thereof, the chip of the main structure of the USB requires at least two pins spared thereof for the crystal oscillator. Thus, in the electronics relatively having a small number of pins, the USB communication system can not be utilized for communication. E.g., the conventional electronic products, SIM card for instance, generally have 4~7 pins, due to the requirements of other system function, the electronics are not capable of sparing two additional pins for the crystal oscillator, and thus the main structure of the USB can not be utilized for communication.

Furthermore, with the development of the production process and the improvement of the design technique, the volume of the electronics tends to be smaller and smaller, and the number of the pins thereof tends to be smaller and smaller as well. However, compared with thereof the SOC (System on Chip), the volume of the crystal oscillator component are quite large, which will restrict the development of high integration and miniaturization of the electronics. Therefore, the crystal oscillator turns into a key factor which restricts the application and development of the chips of the USB main structure.

Of course, the clock can also be generated inside the chip of the USB main structure via an RC/LC oscillator, and is supplied for the system. However, due to influence of the process variation of the RC/LC oscillator or other factors, the clock finally generated by the crystal oscillator in the chip often has a deviation of ±20% with the design target, which is not capable of meeting the demand of the system for the accuracy of transmission.

The high-speed USB requires a higher accuracy of the peripheral clock than the full speed equipments (with a communication speed of 12 MHz) and low speed equipments (with a communication speed of 1.5 MHz), and furthermore the data code rate of peripherals of the high-speed USB is 480 Mb, which is much higher than peripherals of the full-speed or low-speed USB peripheral, so the clock generating circuit for the full-speed or low-speed USB peripherals is not suitable for the high-speed USB peripherals.

Therefore, it is necessary to provide an improved circuit for generating USB peripheral clock and a method therefor to overcome the shortcomings mentioned above.

SUMMARY OF THE PRESENT INVENTION

An object of the present invention is to provide a circuit for generating USB peripheral clock and a method therefor, which is capable of supplying a high precision and accuracy master clock for the USB main structure without additionally occupying the pins of the USB main structure, so as to ensure the high-speed communication of the USB main structure.

Accordingly, in order to accomplish the object mentioned above, the present invention provides a circuit for generating USB peripheral clock, comprising: an internal oscillator, a controllable frequency divider, a frequency multiplier, a receiving counter and a frequency division controller, wherein the internal oscillator is for generating a clock having a fixed frequency;

the controllable frequency divider is connected with the internal oscillator and processes frequency division on the clock generated by the internal oscillator;

wherein the frequency multiplier is respectively connected with the controllable frequency divider and a USB main structure, and processes frequency multiplication on the clock according to a fixed times frequency after the frequency division by the controllable frequency divider, and transmits the clock after the frequency multiplication to the USB main structure;

wherein the receiving counter is connected with the frequency multiplier, and receives an SOF packet which is transmitted by a host according to the clock outputted by the frequency multiplier, and counts intervals of receiving the SOF packet; and wherein the frequency division controller is respectively connected with the receiving counter and the controllable frequency divider, and compares the difference between the counting result of the receiving counter and a standard interval, controls and regulates frequency division parameters of the controllable frequency divider according to a comparing result thereof.

Preferably, the internal oscillator is an RC oscillator or an LC oscillator.

Preferably, the clock generated by the internal oscillator is a high-frequency clock.

Preferably, the standard interval is an interval of the host transmitting the SOF packet.

Preferably, a frequency of the clock outputted by the frequency multiplier is 480 MHz.

Accordingly, the present invention further provides a method for generating USB peripheral clock, comprising following steps of:

generating a clock having a fixed frequency by an internal oscillator;

processing frequency division on the clock generated by the internal oscillator via a controllable frequency divider;

processing frequency multiplication on the clock after frequency division according to a fixed times frequency by a frequency multiplier, and transmitting the clock after the frequency multiplication to the USB main structure thereby;

receiving SOF packets transmitted by a host via a receiving counter according to the clock after the frequency multiplication, and counting an interval of the SOF packets received thereby;

comparing a difference between a counting result of the receiving counter device and a standard interval, controlling and regulating frequency division parameters of the controllable frequency divider according to a comparing result thereof; and transmitting the fixed clock after the frequency multiplication to the USB main structure.

Compared with the prior art, the present invention provides the circuit for generating USB peripheral clock and the method thereof, wherein the receiving counter connected with the frequency multiplier, wherein the receiving counter receives an SOF packet which is transmitted by a host according to the clock outputted by the frequency multiplier, and counting intervals of receiving the SOF packet; and wherein the frequency division controller is respectively connected with the receiving counter device and the controllable frequency divider, wherein the frequency division controller compares the difference between the counting result of the receiving counter and the standard interval, controls and regulates frequency division parameters of the controllable frequency divider according to the comparing result thereof;

in such a manner that the frequency division controller controls and regulates frequency division parameters of the controllable frequency divider according to the difference between the counting result of the receiving counter and a standard interval, and in such a manner that the controllable frequency divider is capable of outputting a precise clock which is processed with frequency multiplication by the frequency multiplier to obtain an accurate high-frequency clock. Thus the circuit for generating USB peripheral clock of the present invention is capable of supplying the peripheral clock required by the USB main structure without additionally occupying the pins of the USB main structure, and regulating the peripheral clock to a precise high-frequency clock, so as to accomplish a high-speed USB communication, and ensure the precision of the high-speed USB communication as well.

These and other objectives, features, and advantages of the present invention will become apparent from the following detailed description, the accompanying drawings, and the appended claims.

DETAILED DESCRIPTION OF THE PREFERRED EMBODIMENT

Here, preferred embodiments of the present invention are illustrated combining with the accompanying drawings. In the accompanying drawings, similar reference numbers of elements present similar elements. As mentioned above, the present invention provides a circuit for generating USB peripheral clock and a method thereof, which is capable of supplying a high precision and accuracy master clock for a USB main structure without additionally occupying the pins of the USB main structure, so as to ensure high-speed communication of the USB main structure.

Figure 1:
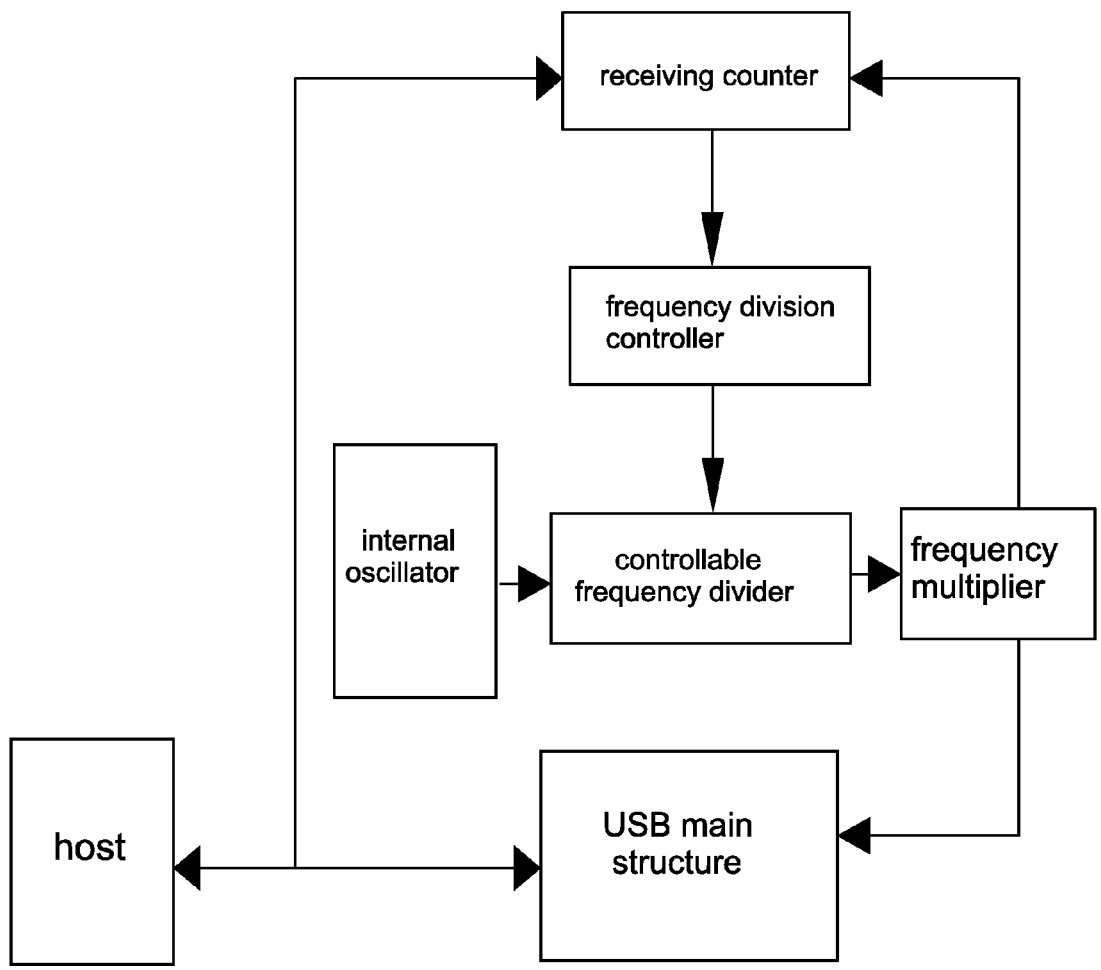
FIG. 1 is a schematic view of connections among a circuit for generating USB peripheral clock, a USB main structure and a host according to a preferred embodiment of the present invention.

Referring to FIG. 1 of the drawings, FIG. 1 is a structural sketch view of connections among a circuit for generating USB peripheral clock, a USB main structure and a host according to a preferred embodiment of the present invention. A circuit for generating USB peripheral clock comprises: an internal oscillator, a controllable frequency divider, a frequency multiplier, a receiving counter and a frequency division controller, wherein the internal oscillator is connected with the controllable frequency divider, so as to generate a clock having a fixed frequency and transmits the clock generated thereof to the controllable frequency divider;

wherein the controllable frequency divider is respectively connected with the frequency multiplier and the frequency division controller, in such a manner that under the control of the frequency division controller, the controllable frequency divider processes frequency division on the clock generated by the internal oscillator, and transmit the clock after the frequency division to the frequency divider;

wherein the frequency multiplier is respectively connected with the receiving counter and the USB main structure, the frequency multiplier processes frequency multiplication on the clock according to a fixed times frequency after the frequency division by the controllable frequency divider, and transmits the clock after the frequency multiplication to the USB main structure;

wherein the receiving counter is respectively connected with the frequency division controller and the host, the receiving counter receives an SOF (Start-of-Frame) packet transmitted by a host according to the clock outputted by the frequency multiplier, counts intervals of receiving the SOF packet, and transmits a counting result to the frequency division controller;

wherein the frequency division controller is connected with the controllable frequency divider, wherein the frequency division controller compares the difference between the counting result of the receiving counter and a standard interval, controls and regulates frequency division parameters of the controllable frequency divider according to a comparing result thereof.

Specifically, according to a preferred embodiment of the present invention, the internal oscillator is an RC oscillator or an LC oscillator. The RC oscillator or the LC oscillator has a simple structure, small volume and is capable of generating a clock having the desired frequency, thus adopting the RC oscillator or the LC oscillator does not impact the high integration and miniaturization development of the products of the USB system. The clock outputted by the RC oscillator or the LC oscillator is a high-frequency clock, which is usually 300 MHz. Furthermore, the clock generated by the RC oscillator and the clock generated by the LC oscillator have a certain error, which is ±20% at maximum, i.e., the clock outputted is between 240 MHz and 360 MHz, which can also be applied in the USB main structure for high-speed communication while cooperating with other elements. A phase generated by the RC oscillator or the LC oscillator is designed according to a precision requirement thereof, which is usually 4, 8 or 16 phases. The controllable frequency divider is respectively connected with the RC oscillator, the LC oscillator, the frequency division controller and the frequency multiplier. The controllable frequency divider processes frequency division on the clock outputted by the RC oscillator or the LC oscillator according to the requirement designed, and transmits the clock after the frequency division to the frequency multiplier, wherein a fraction frequency of the controllable frequency divider can be controlled and regulated by the frequency division controller. The frequency multiplier is further connected with the USB main structure. According to a fixed proportion, the frequency multiplier processes frequency multiplication on the clock generated by the controllable frequency divider in the frequency division process, in such a manner that a high-frequency clock of 480 MHz is generated, so as to supply the USB main structure with a master clock, in such a manner that the USB main structure is capable of processing high-speed communication normally, wherein the multiplication frequency of the frequency multiplier is designed according to a frequency of the clock outputted by the controllable frequency divider, and the frequency of the clock outputted by the frequency multiplier is 480 MHz. Significantly, since the high-frequency clock generated by the RC oscillator or the LC oscillator has an error, the clock outputted by the frequency multiplier is not precisely at 480 MHz as well, and a specific regulation and calibration is further needed. The receiving counter is respectively connected with the frequency multiplier and the frequency division controller. The receiving counter receives the SOF packet transmitted by the host according to the clock outputted by the frequency multiplier, counts intervals of receiving the SOF packet, and transmits a counting result to the frequency division controller. It is well known that the interval for the host to transmit the SOF packet is a standard interval, which is fixedly at 125 us. If the frequency multiplier transmits a precise clock of 480 MHz to the receiving counter, the interval for the receiving counter to receive the SOF packet is the standard 125 us accordingly. However, because the clock outputted by the frequency multiplier to the receiving counter has an error and is not precisely at 480 MHz, an actual interval for the receiving counter to receive the SOF packet has a deviation with the standard interval. The frequency division controller compares the deviation between the counting result of the receiving counter and the standard interval, and regulates a frequency division parameter of the controllable frequency divider according to a comparing result, in such a manner that the clock outputted by the controllable frequency divider is processed with frequency multiplication by the frequency multiplier according to a fixed times frequency to obtain a precise frequency of 480 MHz.

In the preferred embodiments of the present invention, the controllable frequency divider, the frequency multiplier, the receiving counter and the frequency division controller form a feedback loop. During the process of utilization, according to the comparing result, the frequency division controller can control and regulate the controllable frequency divider repeatedly for multiple times until a clock for controlling outputted by the frequency multiplier is precisely at 480 MHz. By the multiple and repeated regulation, the frequency multiplier is capable of outputting a precise and constant clock of 480 MHz, in such a manner that the USB main structure is capable of processing high-speed communication for various packets with the host in high precision.

A specific implementation process of the circuit for generating USB peripheral clock of the present invention is illustrated combining with FIG. 1 of the drawings as follows.

The clock generating clock adopts an LC oscillator of 300 MHz. The LC oscillator generates an 8-phase clock to supply the controllable frequency divider for processing fraction frequency, wherein a frequency error of the clock maybe quite large, which is approximately ±20% at maximum. The controllable frequency divider processes frequency division on the clock inputted by the LC oscillator to generate a clock approximately at 1 MHz, which is outputted to the frequency multiplier. The frequency multiplier processes frequency multiplication on the clock to about 480 MHz, which is supplied to the USB peripheral clock (the USB main structure) and the receiving counter for application. Since the frequency of the clock outputted by the LC oscillator is at 300 MHz±20%, a range of frequency division of the controllable frequency divider is 300±20% as well, i.e., ⅛ for a step within 240-360 MHz. In the process mentioned above, at the beginning, a frequency deviation of the system is quite large. However, compared with general high-speed USB packets, the SOF packet has an significant characteristic that an EOP (End of Procedure) of the high-speed SOF packet is quite long, which is 40 Bits, and thereof the general packet is 8 Bits, i.e., only the high-speed SOF packet has a long EOP, in such a manner that even the frequency deviation is large, the receiving counter is easy to receive and collect the high-speed SOF packet, counting the interval for receiving contiguous SOF packet simultaneously, and outputting the counting result to the frequency division controller. The frequency division controller analyzes the counting result supplied by the receiving counter, compares the counting result with the interval for the host to transmitting the high-speed SOF packet, and regulates a frequency division parameter of the controllable frequency divider according to the comparing result. By continuous feedback and regulation, the controllable frequency divider finally generates a precise frequency division clock of 1 MHz, which is then processed by the frequency multiplier, so as to supply the system with a precise clock of 480 MHz for meeting the requirement of the USB high-speed transmission system.

After the final regulation process mentioned above is completed, a precision of the 480 MHz clock finally generated is 0.52% (¹⁄₂₄₀*⅛) at minimum, which is far less than ±0.5% require by the USB high-speed system, and meets the requirement of the USB system for the precision of the clock while transmitting data in a high speed.

Figure 2:
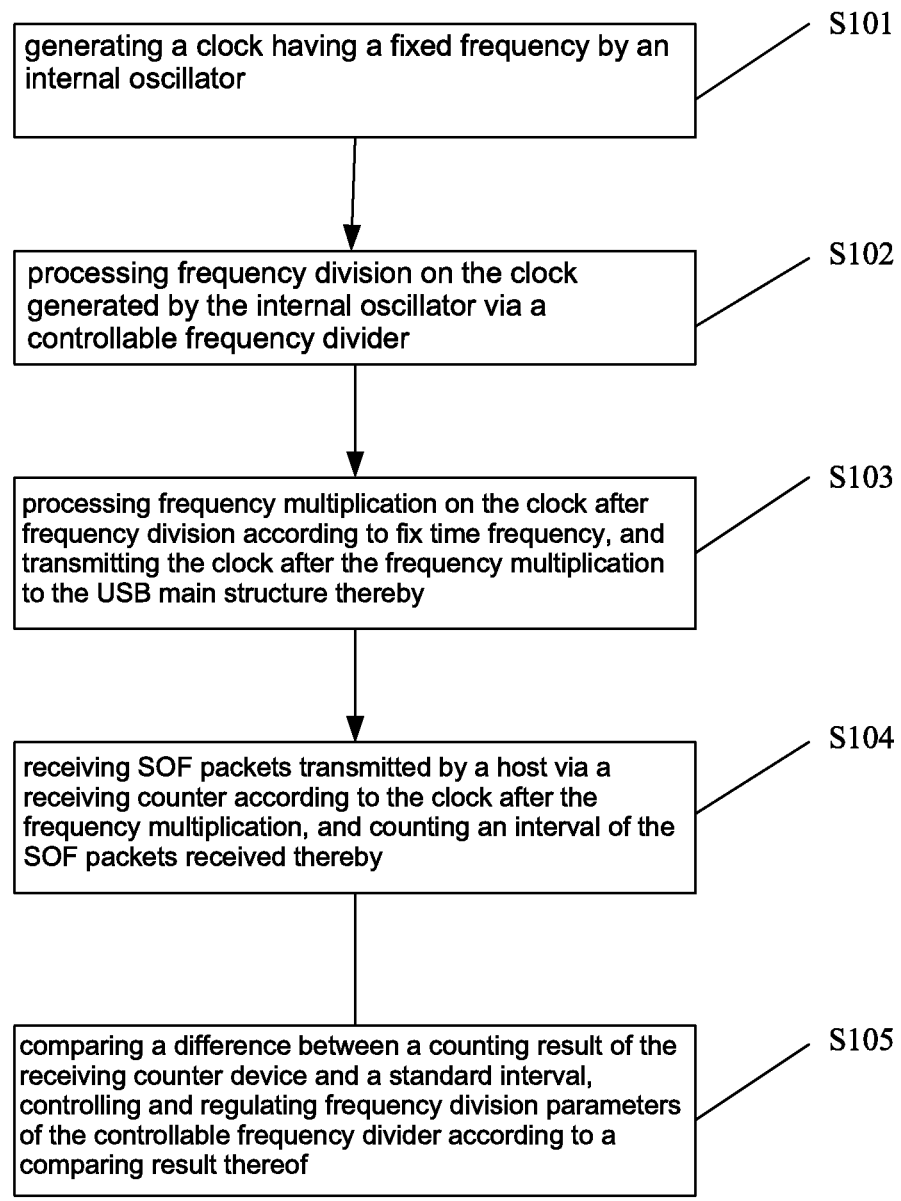
FIG. 2 is a flow chart of a method for generating a USB peripheral clock according to a preferred embodiment of the present invention.

Combining with FIG. 2 of the drawings, a circuit for generating USB peripheral clock is illustrated as follows. As shown in the FIG. 2, the method for generating USB peripheral clock comprises following steps of:

S101: generating a clock having a fixed frequency by an internal oscillator;

wherein, the clock generate by the internal oscillator is a high-frequency clock, which is often 300 MHz, wherein the high-frequency clock is processed by subsequent steps to be a master clock meeting the requirements for high-speed communication of the USB main structure, in such a manner that the internal oscillator is utilized for supplying the master clock to the USB main structure, and the crystal oscillator is needless for supplying the clock required, which is in favor of the high integration and miniaturization development of products of the USB system;

wherein furthermore, the internal oscillator is an RC oscillator or the LC oscillator, which is because the RC oscillator or the LC oscillator has simple structure and small volume and is suitable for the high integration and miniaturization development of the products of the USB system;

wherein the clock generate by the RC oscillator or the LC oscillator has a certain error, which reaches ±20% at maximum and requires regulation and calibration in the subsequent steps;

S102: processing frequency division on the clock generated by the internal oscillator via a controllable frequency divider;

wherein the controllable frequency divider processes fraction frequency on the high-frequency clock generated by the RC oscillator or the LC oscillator according to requirements, so as to be convenient for further processing on the clock in the subsequent steps;

S103: processing frequency multiplication on the clock after frequency division according to a fixed times frequency by a frequency multiplier, and transmitting the clock after the frequency multiplication to the USB main structure thereby;

wherein according to a fixed times frequency, the frequency multiplier processes frequency multiplication on the clock generate by the controllable frequency divider, so as to generate a high-frequency clock of 480 MHz, and transmits the clock after the frequency multiplication to the USB main structure, in such a manner that the USB main structure is capable of processing high-speed communication;

wherein a multiplication frequency of the frequency multiplier is preset according to the frequency of the clock outputted by the controllable frequency divider, and finally the clock outputted by the frequency multiplier is 480 MHz;

wherein significantly, since the high-frequency clock generated by the RC oscillator or the LC oscillator has an error, the clock outputted by the frequency multiplier is not precisely at 480 MHz as well, and a specific regulation and calibration is further needed;

S104: receiving SOF packets transmitted by a host via a receiving counter according to the clock after the frequency multiplication, and counting an interval of the SOF packets received thereby;

wherein according to the clock outputted by the frequency multiplier, the receiving counter receives the SOF packet transmitted by the host, counts the interval for receiving the SOF packet, and transmits the counting result to the frequency division controller;

S105: comparing a difference between a counting result of the receiving counter device and a standard interval, controlling and regulating frequency division parameters of the controllable frequency divider according to a comparing result thereof;

wherein it is well known that the interval for the host to transmit the SOF packet is a standard interval, which is fixedly 125 us, if the frequency multiplier transmits a precise clock of 480 MHz to the receiving counter, the interval for the receiving counter to receive the SOF packet is the standard 125 us, however, because the clock outputted by the frequency multiplier to the receiving counter has an error and is not precisely at 480 MHz, an actual interval for the receiving counter to receive the SOF packet has a deviation with the standard interval, in this step, the frequency division controller compares the deviation between the counting result of the receiving counter and the standard interval, and regulates a frequency division parameter of the controllable frequency divider according to a comparing result, in such a manner that the clock outputted by the controllable frequency divider is processed with frequency multiplication by the frequency multiplier according to a fixed times frequency to obtain a precise frequency of 480 MHz.

In the process mentioned above, in order to ensure that the clock finally transmitted to the USB main structure is a precise clock of 480 MHz, the step S105 can be repeated for multiple times until the clock outputted by the frequency multiplier is the precise clock of 480 MHz, so as to ensure the precision of the clock outputted by the frequency multiplier. From the descriptions mentioned above, by the regulation and the calibration of the circuit for generating USB peripheral clock and the method therefor of the present invention, the frequency multiplier is capable of outputting the precise and constant clock of 480 MHz, in such a manner that under the control of the clock the USB main structure is capable of processing high-speed communication for various packets with the host in high-precision.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A circuit for generating USB peripheral clock, comprising:

an internal oscillator for generating a clock having a fixed frequency;

a controllable frequency divider, wherein the controllable frequency divider is connected with the internal oscillator and processes frequency division on the clock generated by the internal oscillator;

a frequency multiplier respectively connected with the controllable frequency divider and a USB main structure, wherein according to a fixed times frequency, the frequency multiplier processes frequency multiplication on the clock after the frequency division by the controllable frequency divider, and transmits the clock after the frequency multiplication to the USB main structure;

a receiving counter connected with the frequency multiplier, wherein the receiving counter receives an SOF packet which is transmitted by a host according to the clock outputted by the frequency multiplier, and counts intervals of receiving the SOF packet; and a frequency division controller respectively connected with the receiving counter and the controllable frequency divider, wherein the frequency division controller compares the difference between the counting result of the receiving counter and a standard interval, controls and regulates frequency division parameters of the controllable frequency divider according to a comparing result thereof;

wherein a phase generated by the RC oscillator or the LC oscillator is designed according to a precision requirement thereof, which is 4, 8 or 16 phases;

the controllable frequency divider is respectively connected with the RC oscillator, the LC oscillator, the frequency division controller and the frequency multiplier;

the controllable frequency divider processes frequency division on the clock outputted by the RC oscillator or the LC oscillator according to requirement designed, and transmits the clock after the frequency division to the frequency multiplier, wherein a fraction frequency of the controllable frequency divider is controlled and regulated by the frequency division controller;

the frequency multiplier is further connected with the USB main structure; according to a fixed proportion, the frequency multiplier processes frequency multiplication on the clock generated by the controllable frequency divider in the frequency division process, in such a manner that a high-frequency clock of 480 MHz is generated, so as to supply the USB main structure with a master clock, in such a manner that the USB main structure is capable of processing high-speed communication normally, wherein a multiplication frequency of the frequency multiplier is designed according to a frequency of the clock outputted by the controllable frequency divider, and the frequency of the clock outputted by the frequency multiplier is 480 MHz;

since the high-frequency clock generated by the RC oscillator or the LC oscillator has an error, the clock outputted by the frequency multiplier is not precisely at 480 MHz, a specific regulation and calibration is further needed;

the receiving counter is respectively connected with the frequency multiplier and the frequency division controller, the receiving counter receives the SOF packet transmitted by the host according to the clock outputted by the frequency multiplier, counts intervals of receiving the SOF packet, and transmits a counting result to the frequency division controller, the interval for the host to transmit the SOF packet is a standard interval, which is fixedly at 125 us, when the frequency multiplier transmits a precise clock of 480 MHz to the receiving counter, the interval for the receiving counter to receive the SOF packet is the standard 125 us accordingly; however, because the clock outputted by the frequency multiplier to the receiving counter has an error and is not precisely at 480 MHz, an actual interval for the receiving counter to receive the SOF packet has a deviation with the standard interval;

the frequency division controller compares the deviation between the counting result of the receiving counter and the standard interval, and regulates a frequency division parameter of the controllable frequency divider according to a comparing result, in such a manner that the clock outputted by the controllable frequency divider is processed with frequency multiplication by the frequency multiplier according to a fixed times frequency to obtain a precise frequency of 480 MHz.

2. A circuit for generating USB peripheral clock, comprising:

an internal oscillator for generating a clock having a fixed frequency;

a controllable frequency divider, wherein the controllable frequency divider is connected with the internal oscillator and processes frequency division on the clock generated by the internal oscillator;

a frequency multiplier respectively connected with the controllable frequency divider and a USB main structure, wherein according to a fixed times frequency, the frequency multiplier processes frequency multiplication on the clock after the frequency division by the controllable frequency divider, and transmits the clock after the frequency multiplication to the USB main structure;

a receiving counter connected with the frequency multiplier, wherein the receiving counter receives an SOF packet which is transmitted by a host according to the clock outputted by the frequency multiplier, and counts intervals of receiving the SOF packet; and a frequency division controller respectively connected with the receiving counter and the controllable frequency divider, wherein the frequency division controller compares the difference between the counting result of the receiving counter and a standard interval, controls and regulates frequency division parameters of the controllable frequency divider according to a comparing result thereof;

wherein the internal oscillator is an RC oscillator or an LC oscillator;

wherein the LC oscillator has a frequency of 300 MHz;

the LC oscillator generates an 8-phase clock to supply the controllable frequency divider for processing fraction frequency, wherein a frequency error of the 8-phase clock is ±20% at maximum;

the controllable frequency divider processes frequency division on the 8-phase clock inputted by the LC oscillator to generate a clock at 1 MHz, which is outputted to the frequency multiplier; and the frequency multiplier processes frequency multiplication on the clock to 480 MHz, which is supplied to the USB peripheral clock and the receiving counter for application; since the frequency of the clock outputted by the LC oscillator is at 300 MHz±20%, a range of frequency division of the controllable frequency divider is 300±20%, and $\frac{1}{8}$ for a step within 240-360 MHz.

3. The circuit for generating USB peripheral clock, as recited in claim 2, wherein at the beginning, a frequency deviation of the system is large, compared with general high-speed USB packets, the SOF packet has an significant characteristic that an EOP (End of Procedure) of the SOF packet is 40 Bits, in such a manner that even the frequency deviation is large, the receiving counter is easy to receive and collect the high-speed SOF packet, count the interval for receiving contiguous SOF packet simultaneously, and output the counting result to the frequency division controller;

the frequency division controller analyzes a counting result supplied by the receiving counter, compares the counting result with the interval for the host to transmitting the high-speed SOF packet; and regulates a frequency division parameter of the controllable frequency divider according to the comparing result;

by continuous feedback and regulation, the controllable frequency divider finally generates a precise frequency division clock of 1 MHz, which is then processed by the frequency multiplier, so as to supply the system with a precise clock of 480 MHz for meeting requirements of the USB high-speed transmission system.

4. The circuit for generating USB peripheral clock, as recited in claim 3, wherein a precision of the 480 MHz clock finally generated is 0.52‰ ($\frac{1}{240} * \frac{1}{8}$).

* * * * *